United States Patent
Gobled et al.

(10) Patent No.: US 6,548,000 B1
(45) Date of Patent: Apr. 15, 2003

(54) METHOD OF MANUFACTURING A MOLDED PIECE OF PLASTIC THAT IS PAINTED IN PART, AND PIECES OBTAINED BY IMPLEMENTING THE METHOD

(75) Inventors: Patrice Gobled, Izernore (FR); Weidong Li, Verneuil S/Seine (FR); Denis Gille, Bellignat (FR)

(73) Assignee: Companie Plastic Omnium, Lyons (FR)

( * ) Notice: Subject to any disclaimer, the term of this patent is extended or adjusted under 35 U.S.C. 154(b) by 0 days.

(21) Appl. No.: 09/487,761

(22) Filed: Jan. 19, 2000

(30) Foreign Application Priority Data

Jan. 21, 1999 (FR) .............................. 99 00628

(51) Int. Cl.[7] .................. B29C 59/00; B29C 39/12; B65B 33/00
(52) U.S. Cl. .................. 264/129; 264/138; 264/247; 264/250; 264/264; 427/154
(58) Field of Search ................ 264/129, 247, 264/264, 245, 246, 250, 138, 511; 427/154

(56) References Cited

U.S. PATENT DOCUMENTS

| | | | | |
|---|---|---|---|---|
| 3,839,129 A | * | 10/1974 | Neumann | |
| 4,307,058 A | * | 12/1981 | Morello et al. | |
| 5,178,976 A | * | 1/1993 | Rose et al. | |
| 5,286,431 A | * | 2/1994 | Banfield et al. | |
| 5,480,297 A | * | 1/1996 | Ross | |

FOREIGN PATENT DOCUMENTS

JP            03130119 A   *   6/1991

OTHER PUBLICATIONS

Patent Abstracts of Japan, vol. 008, No. 189, JP 59 079741.
Patent Abstracts of Japan, vol. 015, No. 336, JP 03 130119.

* cited by examiner

Primary Examiner—Jan H. Silbaugh
Assistant Examiner—Geoffrey P. Shipsides
(74) Attorney, Agent, or Firm—Schweitzer Cornman Gross & Bondell LLP

(57) ABSTRACT

A method of making a piece of plastic that is painted. The method consists in depositing a "peel-off" film inside a mold defining the shape of the piece, which film is suitable for being separated easily from the support to which it is fixed, in making the piece by molding over the film, in painting the piece in full, and in removing the film so as to uncover the non-painted portion of the piece.

24 Claims, 3 Drawing Sheets

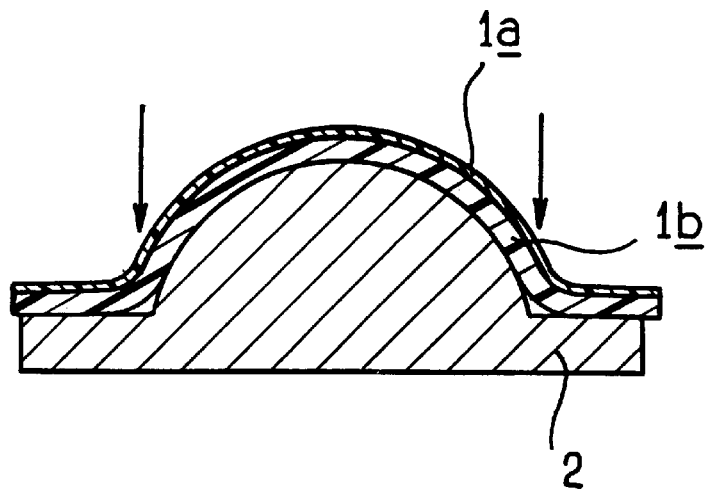
FIG_1
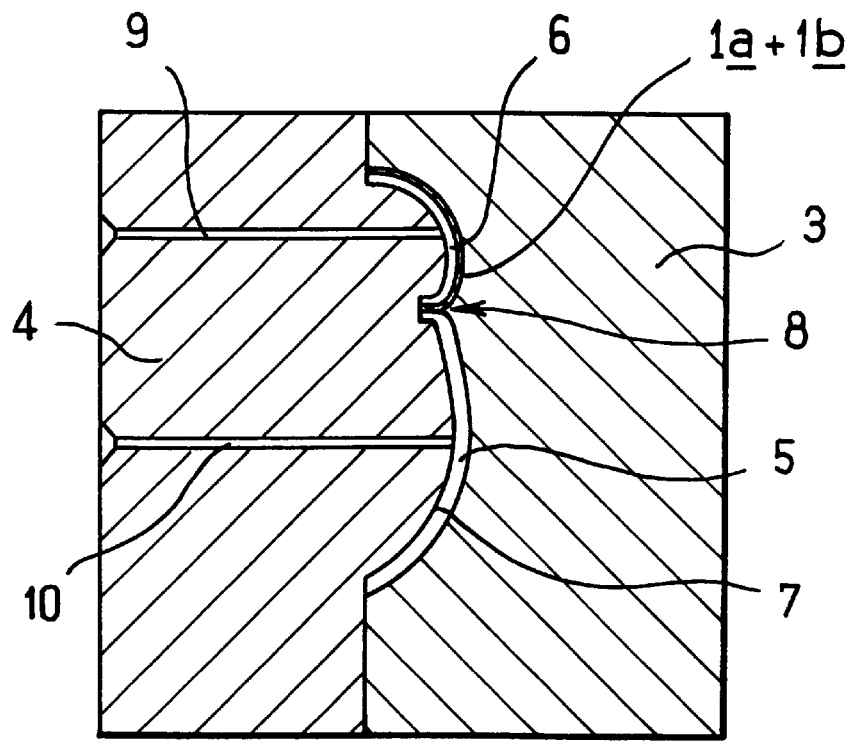
FIG_2

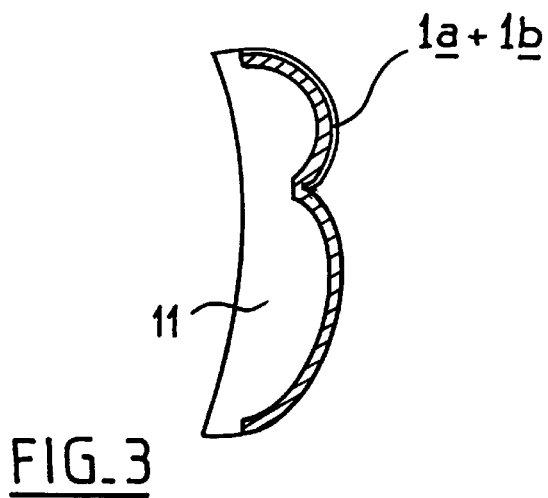
FIG_3
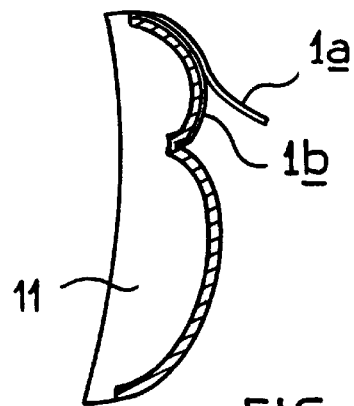
FIG_4
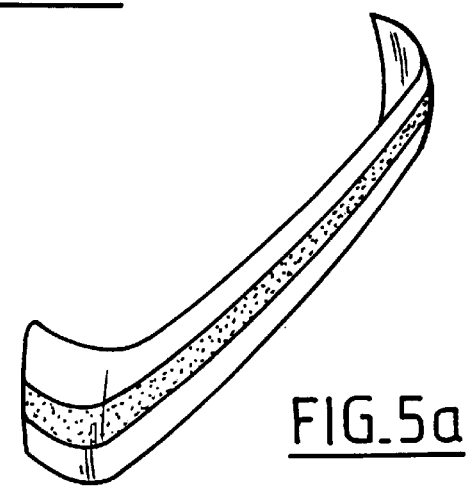
FIG_5a
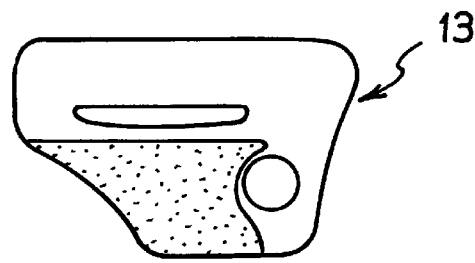
FIG_5b
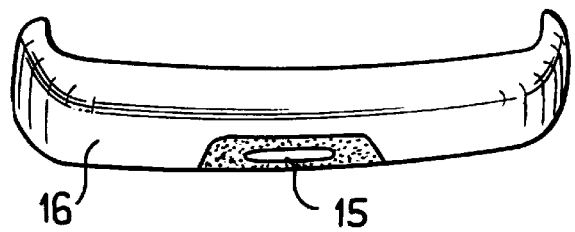
FIG_5d
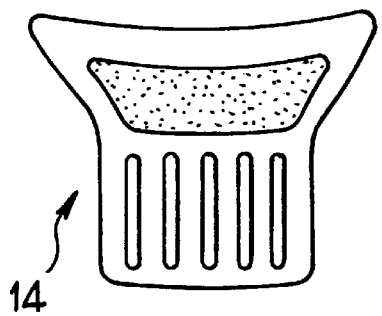
FIG_5c
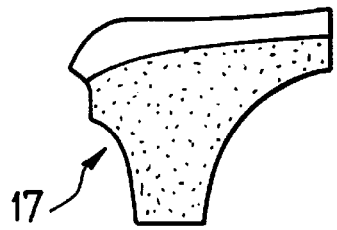
FIG_5e

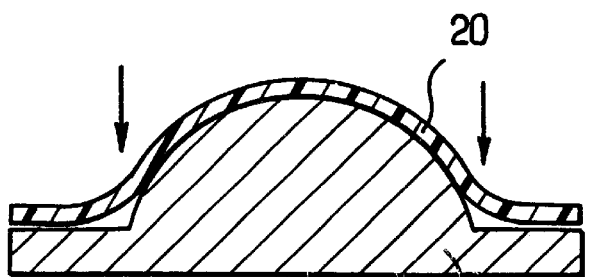
FIG_6
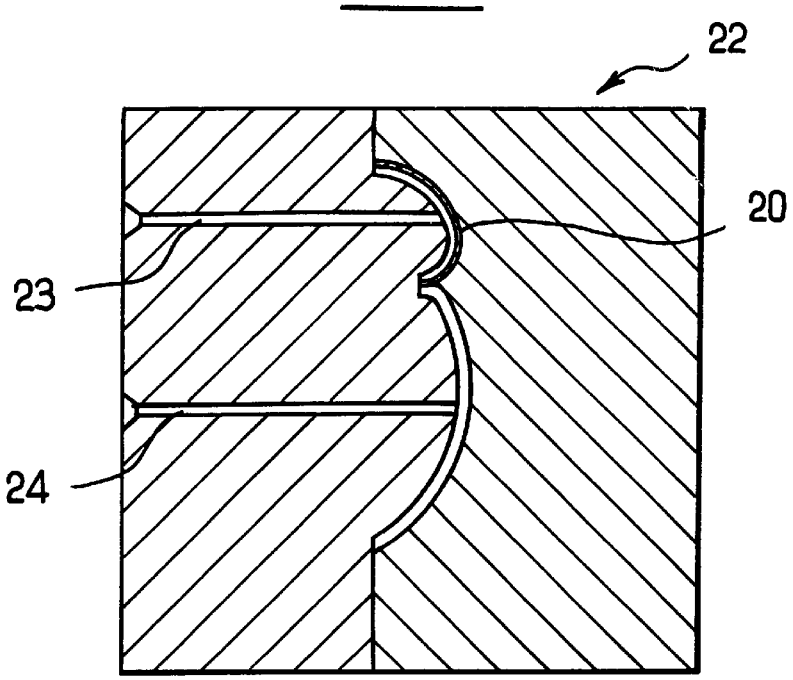
FIG_7
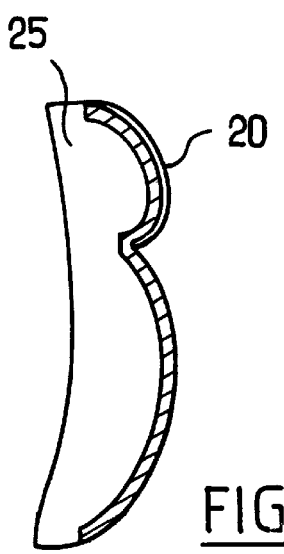
FIG_8
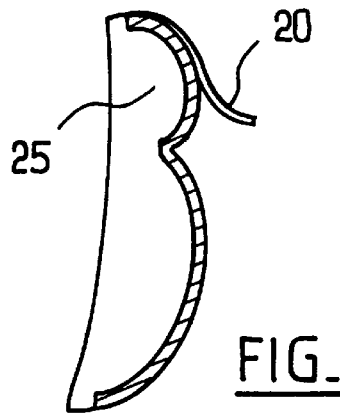
FIG_9

METHOD OF MANUFACTURING A MOLDED PIECE OF PLASTIC THAT IS PAINTED IN PART, AND PIECES OBTAINED BY IMPLEMENTING THE METHOD

The present invention relates to a method of manufacturing a molded piece of plastic that is painted, and to pieces obtained by implementing the method.

BACKGROUND OF THE INVENTION

In order to paint a piece of plastic in part, a masking technique is used, consisting in depositing a mask on a zone of the piece, in painting the piece provided with the mask in full, and in removing the mask after painting in order to uncover the non-painted portion of the piece.

The mask used for that purpose is generally a self-adhesive tape that is placed on the piece immediately before the painting operation.

Such placing of the mask involves a considerable amount of labor, and corresponds to a non-negligible portion of the time required to make the piece.

In addition, the border between the painted portion and the non-painted portion, which appears after the mask has been removed, generally has portions that are uneven and portions that have excess thickness. In addition to spoiling the appearance of the piece, such portions also weaken the paint by making it easier for it to come unstuck.

In addition, when a piece is to be painted in a plurality of colors, it is necessary to perform a plurality of successive masking, painting, and baking operations, which gives rise to extra cost in terms of labor and of energy.

OBJECTS AND SUMMARY OF THE INVENTION

An object of the present invention is to solve those drawbacks.

The present invention provides a method of making a piece of plastic that is painted, said method being consisting in depositing a "peel-off" film inside a mold defining the shape of the piece, which film is suitable for being separated easily from the support to which it is fixed, in making the piece by molding over the film, in painting the piece in full, and in removing the film so as to uncover the non-painted portion of the piece.

In the invention the "non-painted portion of the piece", is a portion that has not received any application of paint by conventional painting means, and said portion may therefore be colored by other means.

The method of the invention makes it possible to omit the step consisting in putting a mask into place on the piece before the painting operation, since, in the invention, this is achieved by depositing the peel-off film in the mold at the place corresponding to the non-painted portion of the piece.

In a first implementation of the invention, the peel-off film is fixed temporarily by adhesion to a sheet situated on that side of the peel-off film which faces the plastic. The sheet is overmolded during the molding of the piece, and remains bonded thereto, whereas the peel-off film can be separated from the sheet after the overmolding, and after the piece has been painted, thereby causing the non-painted sheet to appear.

In this implementation, the sheet is advantageously constituted by a colored film, so that removing the peel-off film uncovers the colored film constituting the sheet.

In this way, it is possible to make a piece having two tints: that of the paint, and that of the colored film constituting the sheet.

In another implementation of the invention, the peel-off film is made of a material that is not compatible with the plastic of which the piece is made, i.e. it adheres poorly to said plastic.

In which case, the film can be separated directly from the molded piece after said molded piece has been painted, then allowing the plastic constituting the piece to appear.

To implement the invention, the following plastics may be used for the film and for the piece: ABS (acrylonitrile-butadiene-styrene) terpolymer, TPO (thermoplastic olefin), PET (polyethylene terephthalate), PE (polyethylene), PC (polycarbonate), PMMA (polymethyl methacrylate), ASA (acrylonitrile-styrene-acrylonitrile), a PBT/PC (polybutylene/polycarbonate) alloy, a PA/PC (polyamide/polycarbonate) alloy, PVC (polyvinyl chloride), POM (polyoxymethylene), acrylic, PU (polyurethane), PTFE (polytetrafluoroethylene), and PA (polyamide).

Advantageously, the film (together with the sheet if a sheet is provided) is preformed before it is put in place in the mold, and it is cut to the exact dimensions of that portion of the piece which is to be masked.

The method of the invention is particularly advantageous for making a piece having two tints, because one of the tints can be that of the sheet temporarily supporting the peel-off film or be mixed with the plastic of which the piece is made, if the peel-off film is not fixed to a sheet, the other tint being applied by painting.

The present invention also provides pieces obtained by implementing the above-defined method, and in particular pieces having two tints.

BRIEF DESCRIPTION OF THE DRAWINGS

In order for the invention to be better understood, a description follows of implementations given by way of non-limiting example, with reference to the accompanying drawings, in which:

FIG. 1 is a section view of a film that can be used in a first implementation of the invention, during preforming;

FIG. 2 is a section view of an injection mold serving to make a piece of plastic;

FIG. 3 is a section view of the piece as molded;

FIG. 4 is a view analogous to FIG. 3 showing how the film is removed;

FIGS. 5a to 5e show examples of pieces that can be made by implementing the method of the invention;

FIG. 6 is a section view of a film that can be used in a second implementation of the invention, during preforming;

FIG. 7 is a section view of an injection mold serving to make a piece of plastic;

FIG. 8 is a section view of the piece as molded; and

FIG. 9 is a view analogous to FIG. 3, showing how the film is removed.

MORE DETAILED DESCRIPTION

FIG. 1 shows a film 1a of plastic, e.g. a film of ABS. This film is fixed temporarily to a sheet 1b of TPO that is monochrome colored.

The film and the sheet that supports it are firstly deposited on a preform 2 and subjected to heating so as to make them fit said preform snugly.

When the assembly made up of the film 1a and of the sheet 1b has reached the desired shape, said assembly is cut (as indicated by the arrows) to the exact dimensions of the portion of the piece that is to be masked.

The film-and-sheet assembly can then be put in place in the mold for making the piece.

The mold is shown in FIG. 2. It is made up of a die 3 and of a punch 4, and these two elements define a cavity 5 between them in the shape of a vehicle bumper skin.

This cavity comprises top portion 6 and a bottom portion 7 separated by a style line 8.

Each portion of the cavity is provided with its own feed channel 9, 10.

The film 1a thermoformed with the sheet 1b and having dimensions corresponding exactly to those of the top portion is positioned in the top portion 6 of the cavity and against the die 3.

Polypropylene is then injected into the top feed channel 9 so as to be molded over the film and the sheet.

Once this overmolding has been performed, the injection is completed by sending polypropylene into the bottom feed channel 10 so as to fill the entire cavity.

The cooled bumper skin 11 is then painted in full, e.g. by spraying it with paint.

After the paint has dried, a corner of the overmolded film 1a is taken hold of, and it is pulled away so as to separate the film from the piece, which is made possible by the fact that the "peel-off" film 1a adheres poorly to the sheet 1b.

The layer of paint with which the film is covered is thus removed from the piece, thereby making it possible to uncover the monochrome of the sheet at the corresponding place on the piece. The piece thus has two tones: the tone of the paint and the tone of the sheet 1b.

The present invention is applicable to various pieces of bodywork for motor vehicles. Examples of such pieces are given in FIGS. 5a to 5e which show respectively a bumper 12 whose bead is not painted, an inside door panel 13, an air intake grille 14 serving to decorate a radiator, an air intake zone 15 in a bumper 16, and a fender 17.

FIGS. 6 to 9 show another implementation of the invention, in which the film 20 is not fixed to a sheet, but rather it constitutes on its own the element to be preformed and to be put in place in the mold for the piece before said piece is molded by overmolding the film.

Said film is made of a material that is incompatible with the plastic of which the piece is made, so that no lasting bond is set up between the material of which the piece is made and the film.

As described above with reference to FIG. 1, the film 20 is firstly preformed and then cut on a preform 21, as shown in FIG. 6.

The preformed and cut film is then placed in an open mold 22 shown in FIG. 7, and plastic is injected into the mold via its feed channels 23 and 24 using a two-step injection process described above with reference to FIG. 2.

The resulting piece 25 shown in FIG. 8 is then painted in full.

Once the paint has dried, the film 20 is removed from the piece, and a non-painted portion 26 of the part is uncovered, as shown in FIG. 9.

Since the plastic of which the piece is made has been colored, e.g. by incorporating pigments into it, the piece has two colors, the color of the paint and the color of the colored plastic.

Naturally, the above-described implementations are in no way limiting, and they may accommodate any desirable modifications without going beyond the ambit of the invention.

What is claimed is:

1. A method of making a painted piece of plastic material having a non-painted portion, said method comprising:
   (a) depositing a peel-off film inside a mold defining a shape of the piece, said peel-off film being deposited at a place corresponding to the non-painted portion of the piece,
   (b) molding a plastic material over the film in the mold to form the piece,
   (c) removing the piece from the mold with said peel-off film attached thereto,
   (d) painting a layer of paint onto the piece with said peel-off film attached thereto, and
   (e) removing the peel-off film and layer of paint covering the film to uncover the non-painted portion of the piece.

2. A method according to claim 1, wherein the peel-off film is made of a material that is not compatible with the plastic material of which the piece is made, enabling the film to be separated from the molded piece after said piece has been painted.

3. A method according to claim 1, wherein the piece comprises a plastic material selected from the group consisting of: ABS (acrylonitrile-butadiene-styrene) terpolymer, TPO (thermoplastic olefin), PET (polyethylene terephthalate), PE (polyethylene), PC (polycarbonate), PMMA (polymethyl methacrylate), ASA (acrylonitrile-styrene-acrylonitrile), a PBT/PC (polybutylene/polycarbonate) alloy, a PA/PC (polyamide/polycarbonate) alloy, PVC (polyvinyl chloride), POM (polyoxymethylene), acrylic, PU (polyurethane), PTFE (polytetrafluoroethylene), and PA (polyamide).

4. A method according to claim 1, wherein the film is preformed before being put in place in the mold.

5. A method according to claim 1, wherein said painting comprises depositing paint all over a surface of the piece not covered with said peel-off film and all over said peel-off film.

6. A method according to claim 1, wherein said peel-off film is cut prior to being put in place in the mold, the dimensions of said peel-off film corresponding to dimensions of a portion of the piece to be masked.

7. A method according to claim 1, comprising making the piece with two different tints, one of the tints corresponding to the tint of the plastic material that is molded, the other tint being applied by painting.

8. A method according to claim 1, wherein said mold comprises a die and a punch which define a cavity therebetween, said cavity comprising a top portion and a bottom portion, each portion of the cavity being provided with a feed channel, and wherein said film is positioned in said top portion of the cavity, said film having dimensions corresponding to those of said top portion.

9. A method according to claim 1, comprising painting the piece by spraying it with paint.

10. A method according to claim 1, wherein the piece is a bodywork piece of a motor vehicle.

11. A method according to claim 1, wherein the piece is: a bumper, an inside door panel, an air intake grille, an air intake zone in a bumper, or a fender.

12. A method according to claim 1, wherein the film comprises a plastic material selected from the group consisting of: ABS (acrylonitrile-butadiene-styrene) terpolymer, TPO (thermoplastic olefin), PET (polyethylene terephthalate), PE (polyethylene), PC (polycarbonate), PMMA (polymethyl methacrylate), ASA (acrylonitrile-styrene-acrylonitrile), a PBT/PC (polybutylene/ polycarbonate) alloy, a PA/PC (polyamide/polycarbonate) alloy, PVC (polyvinyl chloride), POM (polyoxymethylene), acrylic, PU (polyurethane), PTFE (polytetrafluoroethylene), and PA (polyamide).

13. A method of making a painted piece of plastic material, said method comprising:
   (a) depositing a peel-off film fixed temporarily by adhesion to a sheet, inside a mold defining a shape of the piece,
   (b) molding in the mold a plastic material over said sheet to form said piece, said sheet facing the plastic material,
   (c) removing said piece and said sheet from the mold,
   (d) painting a layer of paint onto the piece with said peel-off film attached thereto, and
   (e) removing the peel-off film and layer of paint covering the film from said sheet to expose said sheet which remains bonded to the plastic material and is unpainted in the region of the peel-off film.

14. A method according to claim 13, wherein the peel-off film is made of a material that is not compatible with the material of which the sheet is made, enabling the film to be separated from the sheet after said piece has been painted.

15. A method according to claim 13, wherein the piece comprises a plastic material selected from the group consisting of: ABS (acrylonitrile-butadiene-styrene) terpolymer, TPO (thermoplastic olefin), PET (polyethylene terephthalate), PE (polyethylene), PC (polycarbonate), PMMA (polymethyl methacrylate), ASA (acrylonitrile-styrene-acrylonitrile), a PBT/PC (polybutylene/polycarbonate) alloy, a PA/PC (polyamide/polycarbonate) alloy, PVC (polyvinyl chloride), POM (polyoxymethylene), acrylic, PU (polyurethane), PTFE (polytetrafluoroethylene), and PA (polyamide).

16. A method according to claim 13, wherein the film comprises a plastic material selected from the group consisting of: ABS (acrylonitrile-butadiene-styrene) terpolymer, TPO (thermoplastic olefin), PET (polyethylene terephthalate), PE (polyethylene), PC (polycarbonate), PMMA (polymethyl methacrylate), ASA (acrylonitrile-styrene-acrylonitrile), a PBT/PC (polybutylene/polycarbonate) alloy, a PA/PC (polyamide/polycarbonate) alloy, PVC (polyvinyl chloride), POM (polyoxymethylene), acrylic, PU (polyurethane), PTFE (polytetrafluoroethylene), and PA (polyamide).

17. A method according to claim 13, wherein the film and the sheet are preformed before being put in place in the mold.

18. A method according to claim 13, wherein said painting comprises depositing paint all over a surface of the piece not covered by the film and all over the film.

19. A method according to claim 13, wherein said peel-off film is cut prior to being put in place in the mold, the dimensions of said peel-off film corresponding to dimensions of a portion of the piece to be masked.

20. A method according to claim 16, further characterized in making the piece with two different tints, one of the tints corresponding to the tint of said sheet, the other tint being applied by painting.

21. A method according to claim 13, wherein said mold comprises a die and a punch which define a cavity therebetween, said cavity comprising a top portion and a bottom portion, each portion of the cavity being provided with a feed channel and wherein said film is positioned in the top portion of said cavity, said film having dimensions corresponding to those of said top portion.

22. A method according to claim 13, further characterized in painting the piece by spraying it with paint.

23. A method according to claim 13, wherein the piece is a bodywork piece of a motor vehicle.

24. A method according to claim 13, wherein the piece is a bumper, an inside door panel, an air intake grille, an air intake zone in a bumper, or a fender.

* * * * *